United States Patent
Benson (10) Patent No.: US 6,470,079 B1
(45) Date of Patent: Oct. 22, 2002

(54) SYSTEM AND METHOD FOR REAL-TIME REPORTING OF ADVERTISING EFFECTIVENESS

(75) Inventor: Lonnie John Benson, Kirkland, WA (US)

(73) Assignee: Who's Calling, Inc., Kuzkland, WA (US)

( * ) Notice: Subject to any disclaimer, the term of this patent is extended or adjusted under 35 U.S.C. 154(b) by 0 days.

(21) Appl. No.: 09/350,785

(22) Filed: Jul. 9, 1999

(51) Int. Cl.[7] ................ H04M 15/00; G06F 17/60; G06F 17/30; G06F 3/00; G06F 13/00

(52) U.S. Cl. ............... 379/114.13; 379/112.01; 379/112.08; 379/111; 705/9; 705/53; 707/9; 725/37; 725/42

(58) Field of Search ................ 379/111, 112, 379/113, 115, 116, 119, 121, 127, 133, 134, 135, 136, 207; 707/1, 7, 9, 10, 100, 101, 102, 103, 104; 705/1, 7, 8, 9, 10, 50, 59, 53; 725/37, 42

(56) References Cited

U.S. PATENT DOCUMENTS

| | | | |
|---|---|---|---|
| 4,850,007 A | * | 7/1989 | Marino et al. .............. 379/112 |
| 4,989,234 A | * | 1/1991 | Schakowsky et al. ......... 379/92 |
| 5,410,589 A | | 4/1995 | Galligan |
| 5,448,625 A | * | 9/1995 | Lederman ................... 379/112 |
| 5,506,893 A | * | 4/1996 | Buscher et al. ............. 379/114 |
| 5,528,676 A | | 6/1996 | Sussell et al. |
| 5,606,600 A | * | 2/1997 | Elliott et al. ................ 379/112 |
| 5,636,346 A | * | 6/1997 | Saxe .......................... 395/201 |
| 5,740,234 A | * | 4/1998 | Black et al. ................ 379/115 |
| 5,812,642 A | | 9/1998 | Leroy |
| 5,903,635 A | | 5/1999 | Kaplan |
| 5,937,390 A | | 8/1999 | Hyodo |
| 5,948,061 A | | 9/1999 | Merriman et al. |
| 5,960,409 A | | 9/1999 | Wexler |
| 5,974,398 A | | 10/1999 | Hanson et al. |
| 6,006,197 A | * | 12/1999 | D'Eon et al. ................. 705/10 |
| 6,055,510 A | | 4/2000 | Henrick et al. |
| 6,055,573 A | | 4/2000 | Gardenswartz et al. |
| 6,084,953 A | * | 7/2000 | Bardenheuer et al. ...... 379/114 |
| 6,286,005 B1 | * | 9/2001 | Cannon ....................... 707/100 |

FOREIGN PATENT DOCUMENTS

| | | | | |
|---|---|---|---|---|
| GB | 2258065 A | * | 1/1993 | ........... G06F/15/40 |
| WO | WO 01/04780 A2 | * | 1/2001 | ........... G06F/17/00 |
| WO | WO 01/22261 A2 | * | 3/2001 | ........... G06F/17/00 |

OTHER PUBLICATIONS

Newton's Telecom Dictionary, definition of "tandem switch" p. 699, Mar. 1998.*

* cited by examiner

Primary Examiner—Binh Tieu
(74) Attorney, Agent, or Firm—Dorsey & Whitney LLP (57) ABSTRACT

A telecommunications environment includes a switch for connecting calls placed by a caller in response to an advertising campaign. The advertising campaign is identified by a particular directory number (the "campaign number"). The switch monitors calling information related to the call and forwards that calling information to a data recorder. The calling information includes the directory number of the party placing the call, the directory number called, whether the call was connected, the duration of the call, and other information. The data recorder passes the calling information for each advertising campaign to a web server where the calling information is accessible over the Internet. In this manner, a subscriber may connect to the web server over the Internet and request a report on the effectiveness of the advertising campaign.

30 Claims, 5 Drawing Sheets

SYSTEM AND METHOD FOR REAL-TIME REPORTING OF ADVERTISING EFFECTIVENESS

FIELD OF THE INVENTION

The present invention relates to telecommunications systems, and more particularly to the use of telecommunications systems to report on the call traffic to particular directory numbers.

BACKGROUND OF THE INVENTION

Advertisers today struggle with trying to identify which advertising is effective and, more importantly, which is not. Advertisers may spend several thousand dollars or more producing advertising campaigns in an attempt to capture the attention of an intended market. Those advertisers try to target their advertising to particular groups of consumers by tailoring the advertising campaign media, the frequency of the campaign, the nature of the advertisements, and many other techniques. Advertisers may place advertisements in newspapers, magazines, trade journals, direct mailings, yellow pages and television. Unfortunately, advertisers do not have an accurate and timely mechanism for gauging the effectiveness of their advertising campaigns. An age old quote sums up the dilemma of the advertisers: "Half the money I spend on advertising is wasted, and the trouble is, I don't know which half."

Some attempts are being made to identify which advertising campaigns are effective. Examples are the use of different directory numbers (phone numbers) for each advertising campaign. In that way, advertisers may analyze their phone bills at the end of the month and count the number of calls placed to particular directory numbers. That mechanism is crude, inefficient, and untimely. Business people that are focusing on increasing sales and building products or training service people do not have the time to count phone numbers on their phone bills. An automated system that is capable of providing the advertiser with tailored and accurate reports on which advertising campaigns are effective has eluded those skilled in the art.

In addition, the advertiser may be conducting a costly advertising campaign that would be best discontinued immediately if only the advertiser could evaluate immediately whether the campaign was effective. Monthly phone bills or reporting are inadequate to service that advertiser's needs. In addition, such reporting does not capture a crucial piece of information to the advertiser-what calls were attempted to the advertiser but were not completed because of a busy signal or no answer. That information is not available through conventional telephone billing or reporting services. However, that information is extremely valuable to the advertiser. The advertiser would very much like to identify those potential consumers for whom the advertising was effective, but whose needs were unsatisfied because of a no answer or a busy signal.

An effective mechanism for an advertiser to monitor advertising effectiveness has eluded those skilled in the art. Accordingly, a need exists for a system or method for evaluating and reporting on the effectiveness of an advertising campaign being conducted by an advertiser and which is capable of generating a report in near-real-time so that an advertiser always has current information upon which to base its advertising decisions.

SUMMARY OF THE INVENTION

The present invention overcomes the problems identified above by providing a system and method for accurately and timely identifying which of an advertiser's advertising campaigns are effective. Briefly described, the invention provides a telecommunications environment configured to monitor information related to caller traffic responding to advertising campaigns. That information is passed to a network-accessible server and formatted for retrieval over the network. A subscriber to the reporting-service may connect, via the network, to the server and request a report, based on the caller traffic information, for a selected advertising campaign.

More specifically, the telecommunications environment includes a switch for connecting calls placed by a caller in response to an advertising campaign. The advertising campaign is identified by a particular directory number (the "campaign number"). The switch monitors calling information related to the call and forwards that calling information to a data recorder. The calling information includes the directory number of the party placing the call, the directory number called, whether the call was connected, the duration of the call, and other information. The data recorder passes the calling information for each advertising campaign to a web server where the calling information is accessible over the Internet. In this manner, the subscriber may connect to the web server over the Internet and request a report on the effectiveness of the advertising campaign.

In one aspect of the invention, the web server automates the task of identifying the calls made in response to an advertising campaign. The data collector is configured to identify calling information related to a directory number associated with an advertising campaign and forward that information to the web server. The web server includes software for tabulating and formatting that information into a report based on a subscriber's request. The report is generated based on the current information available and in the format specified by the subscriber. The information may be presented based on many different criteria, such as, for example, a total number of calls per campaign, a percentage of calls per campaign, a number of attempted calls that received a busy signal, a number of attempted calls that were not answered, and the like.

In another aspect of the invention, the reports available to the subscriber reflect the latest information available. The calling information may be forwarded from the data collector to the web server in real-time, as the calling information becomes available from the switch. In that manner, a report generated by the web server provides the subscriber with real-time data regarding the effectiveness of the advertising campaigns.

In yet another aspect of the invention, the calling information associated with advertising campaigns may be combined with other information, stored in additional databases either resident on or accessible by the web server, to produce reports of demographic information about the respondents to the campaign.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As summarized above, the present invention allows a reporting-service subscriber to request reports, in real-time, on the effectiveness of an advertising campaign being undertaken by the service subscriber. With reference to the drawings, in which like numerals indicate like elements throughout the several figures, embodiments of the invention will now be described in detail.

Overview of Operating Environment

The following discussion provides an overview of a telecommunications environment in which one embodiment of the present invention may be employed. This discussion is intended to provide the reader with an understanding of the broad functionality of one telecommunications environment that makes possible the advantages of the present invention.

Figure 1:
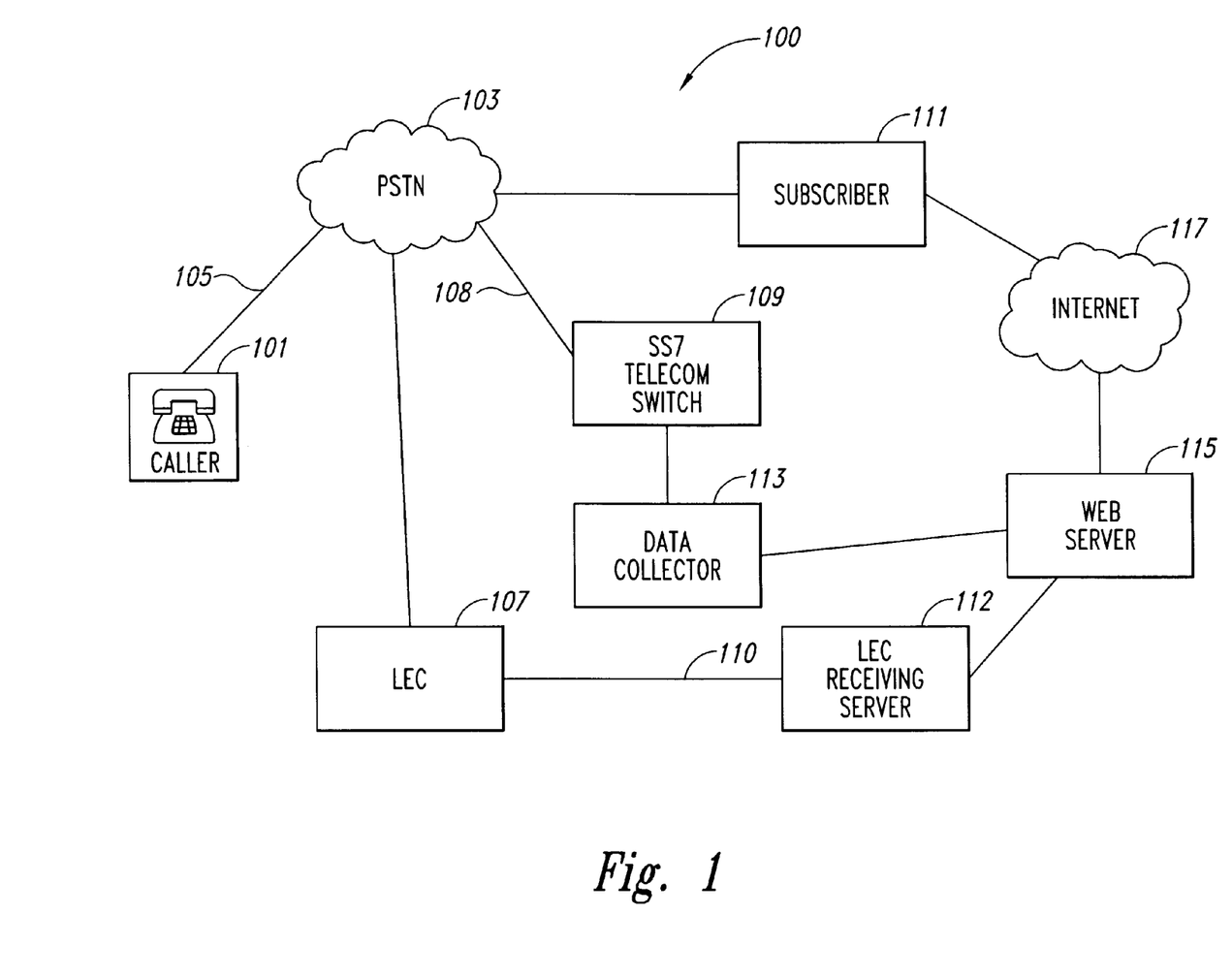
FIG. 1 is a functional block diagram illustrating a telecommunications environment in accordance with one embodiment of the present invention.

FIG. 1 is a functional block diagram of a telecommunications environment including one embodiment of the present invention. Illustrated in FIG. 1 is an exemplary telecommunications environment for placing telephone calls from one location to another location. At the core of the environment is a Public Switch Telephone Network ("PSTN") 103. The PSTN 103 is a conventional telephone network that performs conventional telephone services such as connecting one user of the PSTN 103 to another user to complete a telephone call. One element of the PSTN 103 is the Local Exchange Carrier ("LEC") 107. Briefly described, the LEC 107 is a central office servicing many users of the PSTN 103 in a common geographic location, such as in one city or county. The benefit of the LEC 107 to the present invention is discussed later. The PSTN 103 also includes switches, service control points, etc. The PSTN 103 may also include an advanced intelligent network ("AIN"), which is discussed later.

To operate with the PSTN 103, users are assigned a unique ten digit directory number of the form "NPA-NXX-XXXX" where "N" refers to any numeric digit except 0 or 1 and "X" refers to any one of the 10 numeric digits. The PSTN 103 divides the United States into geographic regions identified by unique three-digit "area codes," more technically referred to as Numbering Plan Area ("NPA") codes. The three digit NPA field within the ten digit directory number refers to the Numbering Plan Area code. When a call is made from one area code to another area code, the three digit NPA prefix must be supplied by the calling party. In addition, certain NPA prefixes are reserved for special reverse-billing procedures, such as the "800," "877," "888," and "900" prefixes. Reverse billing is known in the art.

The three digit prefix "NXX" is sometimes referred to as an "exchange code" or "office code." That three-digit field typically identifies a particular "switch" or local exchange carrier, such as LEC 107, to which the called party is connected. The switch or local exchange carrier may service cellular communications customers, in which case the exchange code, being associated with a cellular switch, identifies the called party as a cellular customer. The last four digits of the ten-digit directory number, identified above by "XXXX," are referred to as the user's line code and identify the particular user's connection to the switch identified by the exchange code. For the purpose of this discussion, the user initiating a call is referred to as the "calling party," and the user to whom the call is intended is referred to as the "called party."

An advanced intelligent network ("AIN") portion of the PSTN 103 may be used to expedite the connection between a calling party and a called party. The AIN is used to transmit data messages between elements of the PSTN 103 for establishing the connection. The data messages contain information related to the call, such as both the calling party's directory number and the called party's directory number. That information can be used to more quickly identify a destination switch for receiving the call. In addition, the AIN is helpful to determine supplemental telecommunications services that either the calling party or the called party may have, such as call forwarding, call waiting, caller identification, etc.

The protocol used by the AIN is often referred to in the art as "Signaling System 7" or "SS7." SS7 is an addressing protocol that speeds up call processing by transmitting call-connection information out-of-band much faster than traditional call switching. The SS7 protocol has enabled services such as fraud detection, caller ID, store and forward, ring back, concurrent data, etc. The SS7 protocol is well known to those skilled in the art and is described in a specification published by the American National Standards Institute (ANSI).

To place a call over the PSTN 103, the calling party, such as Caller 101, initiates a call by providing a directory number to the PSTN 103 via a piece of telecommunications terminal equipment, typically a telephone. In many cases, the calling party need not provide the entire ten-digit directory number. If, for instance, the calling party and the called party are in the same area code, the calling party may often omit the called party's NPA prefix.

The calling party provides the directory number of the called party to a first switch to which the calling party is connected. For instance, if the Caller 101 wishes to call the Subscriber 111, the Caller 101 provides to the PSTN 103 the Subscriber's directory number. The PSTN 103 then directs the call from the Caller 101 to a telecommunications switch to which the Subscriber 111 is connected. In this example, the Subscriber 111 is connected to switch 109. The switch 109 is a conventional SS7 compatible switch, examples of which are the Lucent Technologies 5ESS, the NTI DMS100, Siemens Stromberg and Carlson EWSD and DCO. Those skilled in the art are familiar with the routing of calls within the PSTN 103 and connecting calls to a switch based on the called party's directory number. The switch 109 makes the final connection to the Subscriber 111 via connection 108. Once that connection is made, the call is connected and the Caller 101 and the Subscriber 111 may communicate.

In addition to connecting the calling party to the called party, the switch 109 stores "calling information" related to the call. For example, the switch 109 extracts the calling party's directory number, the called party's directory number, the time and date the call was placed, whether the call was connected successfully, the duration of the call if connected, whether the called party's connection was busy or did not answer, and any other information related to the call. The calling information is used for billing and network maintenance purposes, as well as other less common purposes unrelated to the present invention. The calling information is typically forwarded to a "data collector" 113 for relatively permanent storage. The data collector 113 may be a conventional data processing unit connected to the switch 109 or it may be part of the switch 109. The data collector is described in greater detail below.

This has been an overview of the manner in which a common telecommunications system is used to make and connect calls between users of the system. The following discussion describes how the above described system, in accordance with one embodiment of the present invention, generates reports in real-time for the effectiveness of an advertising campaign.

Example of Advertising Campaign Recording

To begin, the Subscriber 111 may be conducting several advertising campaigns by publishing advertisements in local, regional, or national publications such as newspapers, magazines, or trade journals. In addition, the Subscriber 111 may have advertisements applied to billboards or the sides of trucks that travel the highways. The Subscriber 111 now wishes to determine the effectiveness of each of the several advertising campaigns. As a prerequisite, the Subscriber 111 engineered the several advertising campaigns such that each campaign promotes a unique directory number. In other words, each advertisement includes a different directory number to be called by those people for whom the advertisement was effective. Advertising different directory numbers is made simple through the use of the "800 number" services provided by many telecommunications companies, such as Fox Communications Corp. of Bellevue, Washington. With those services, the Subscriber 111 may secure several directory numbers which all direct calls to the Subscriber 111. In this example, each of those directory numbers has an exchange code associated with the switch 109. In that manner, each call to a calling number is directed to the switch 109 by the PSTN 103 before being connected to the Subscriber 111. One of each of the directory numbers is used in each advertising campaign. The directory numbers associated with the advertising campaigns are referred to in this discussion as "campaign numbers."

The Caller 101 may wish to contact the Subscriber 111 at the campaign number when an advertising campaign has been effective. The Caller 101 initiates a call by providing the campaign number to the PSTN 103. That call is routed through the PSTN 103 in the conventional manner described above. The call is eventually routed from the PSTN 103 to the switch 109. The switch 109 directs the call to the Subscriber 111 so that the Subscriber 111 may service the Caller's request, comment, order, or the like. In addition, as described above, the switch 109 forwards calling information regarding the call to the data collector 113. The calling information is passed to the data collector 113 upon the termination of the call. The data collector 113 accumulates and stores the information passed from the switch 109.

As mentioned above, the data collector 113 accumulates the calling information associated with all of the directory numbers serviced by the switch 109. That task is typically performed for billing purposes to ensure that the calling party or the called party is appropriately billed for the call. In accordance with the invention, the data collector 113 also isolates the calling information related to campaign numbers. In other words, the data collector 113 includes a table identifying the campaign numbers. When calling information arrives regarding one of the campaign numbers in the campaign number table, the data collector 113 forwards that calling information (the "campaign information") to a web server 115. The data collector 113 may forward the campaign information as it arrives or on a timed basis, such as in fifteen minute increments, one-hour increments, several-hour increments, or the like. The rate at which the campaign information is passed from the data collector 113 to the web server 115 limits how current a report may be. For that reason, the data collector 113 of the preferred embodiment is configured to provide the campaign information to the web server 115 in real-time, such as not later than a few hours after the campaign information becomes available at the data collector 113. The web server 115 is described in greater detail below. The role of the web server 115 in the telecommunications system is described here.

The web server 115 receives the calling information associated with each campaign number (the campaign information) from the data collector 113 and stores that information on a permanent storage medium, such as a hard disk drive. The web server 115 tabulates the campaign information based on each campaign number. The table containing the campaign information is as current as the rate at which the data collector 113 provides the campaign information to the web server 115. Consequently, the web server 115 is able to generate reports of the effectiveness of a campaign in real-time.

The web server 115 provides access to the tabulated data over the Internet 117. Although the Internet is described as the preferred wide area network for making the reports available to subscribers, those skilled in the art will appreciate that any wide area network that allows access by subscribers to data stored on the web server 115 will benefit from the present invention. Accordingly, Subscriber 111 may access the web server 115 via a connection to the Internet 117. The connection to the Internet 117 may be any conventional connection that allows access to the web server 115. For example, Subscriber 111 may access the web server 115 using TCP/IP and a conventional dial-up connection over a modem. Alternatively, the subscriber 111 may have a dedicated connection to the Internet 117 that provides constant access. The web server 115 may have a unique HyperText Transfer Protocol (HTTP) address, a unique FTP address, or any other addressing scheme that allows the subscriber 111 to identify the web server 115.

The web server 115 includes server software that allows the subscriber to request a report of a particular advertising campaign's effectiveness at any time. For example, the subscriber 111 may connect to the Internet 117 in the middle of the day on a Tuesday. At that time, Subscriber 111 may log on to the web server 115 using a secure access protocol and issue a request to the web server 115 to provide a report. The issued request identifies the particular advertising campaign of interest by campaign number. The web server 115 responds to the request by reading the data stored in the table of campaign information associated with the campaign number provided by the subscriber 111. Software resident on the web server 115 tabulates the report in accordance with the subscriber's request. Finally, the web server 115 publishes, preferably in HTML format, the report to the subscriber. In this manner, the subscriber 111 is able to access and query the web server 115 as frequently as desired to determine the effectiveness of a particular advertising campaign. Individual elements of the system will be described next, followed by a discussion of exemplary advertising reports enabled by this embodiment of the invention.

Alternatively, the web server 115 may be configured to transmit the report to the subscriber at predetermined intervals, such as immediately, hourly, daily, weekly, or the like. For instance, software may be configured to simulate a subscriber request and cause the web server 115 to generate and transmit the report to the subscriber 111. Alternative means of delivery may also be employed, such as via electronic mail. These and other alternatives will become apparent to those skilled in the art upon a study of the disclosed embodiments.

In another embodiment, the web server 115 may be configured to generate the report in response to a triggering event. Examples of such a triggering event may be an attempted call that received either no answer or a busy signal, or the situation where calling activity to one campaign number exceeds or fails to exceed a predetermined threshold, or the like. For instance, the web server 115 may be configured to analyze the campaign information as it is received from the data collector 113. If the campaign information reflects that a call to a campaign number resulted in either a busy signal or no answer, the web server 115 may respond by issuing a flag to the subscriber 111. In one embodiment, the web server 115 may be configured to extract from the campaign information the calling party's directory number and transmit that directory number directly to the subscriber 111 or someone associated with the subscriber to respond to the missed call. The directory number may be transmitted by digital or voice pager, by e-mail message, by human interaction, or by any other mechanism for alerting the subscriber 111. In that manner, the subscriber 111 can be immediately notified that a potential customer was unable to complete a call, and be provided that potential customer's directory number in order for the subscriber 111 to return the call, rather than hope the customer calls again. Those skilled in the art will see the enormous benefits created by this aspect of the invention over existing technologies.

Moreover, it is not essential to the present invention that the campaign numbers be associated with the switch 109. For example, the subscriber 111 may have existing service with a telecommunications company that operates the LEC 107, which is not capable of providing the reporting service described herein. However, the campaign numbers for the subscriber's advertising campaign have exchange codes associated with the LEC 107 rather than the switch 109. In that situation, the switch 109 may be configured to gather the calling information from the LEC 107. For example, the LEC 107 may also contain a telecommunications switch similar to switch 109. The LEC 107 may read and store calling information associated with any calls made to directory numbers that route to the LEC 107. Calling information associated with campaign numbers that route to the LEC 107 may be gathered and transmitted to an LEC receiving server 112 over a communications link 110. The calling information gathered at the LEC 107 may additionally contain a name associated with the calling party and a zip code associated with the calling party. The transmission of the calling information from the LEC 107 to the LEC receiving server 112 may occur as a batch transfer at a predetermined time, such as daily or nightly, or the LEC 107 may be configured to transmit the calling information more frequently, even on a per-call basis. Once the LEC receiving server 112 has gathered any calling information transmitted from the LEC 107, that information is passed to the web server 115 and normal operation resumes as described above.

Figure 2:
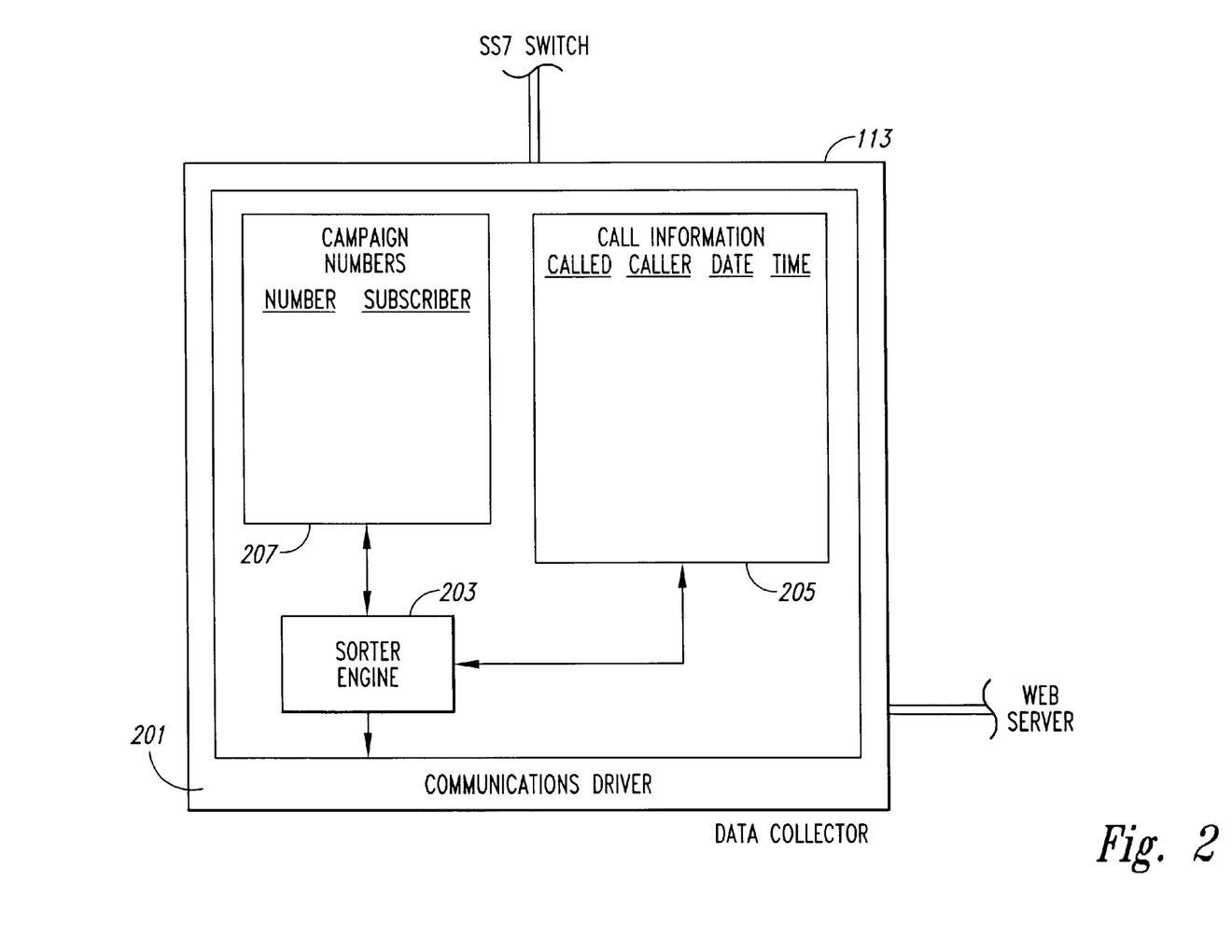
FIG. 2 is a functional block diagram of a data collector element of the telecommunications environment illustrated in FIG. 1.

FIG. 2 is a functional block diagram of the data collector 113 illustrated in FIG. 1. The data collector 113 receives the calling information from the switch 109 associated with every call made. The data collector 113 has a communications driver 201 that is responsible for lower level communications with other data processing equipment, such as the switch 109 and the web server 115. The communications driver 201 receives the information from the switch 109 and passes it to a sorter engine 203. The sorter engine 203 is a software application resident on the data collector 113 and is responsible for tabulating the information received from the switch 109. The sorter engine 203 creates a database 205 with all of the calling information provided by the switch 109.

A second database 207 may reside on the data collector 113 and contain a list of the campaign numbers. The sorter engine 203 parses from the first database 205 that information corresponding to the campaign numbers. To do so, the sorter engine 203 compares the campaign numbers from the second database 207 with the information stored in the database 205 and retrieves the information associated with each of the campaign numbers (the campaign information). The sorter engine 203 may be configured to retrieve the campaign information from the database 205 at pre-selected time intervals, or, alternatively, the sorter engine 203 may be configured to identify the campaign information as the information is being written to the database 205.

The campaign information is then forwarded to the web server 115 via the communications driver 201. Those skilled in the art will appreciate that the campaign information may be temporarily stored or buffered at the data collector 113 during the parsing operation for later transmission to the web server 115.

The LEC receiving server 112 may perform functions similar to those performed by the data collector only for information received from the LEC 107. Those skilled in the art will appreciate that the LEC receiving server 112 may incorporate all or a subset of those components described with respect to the data collector 113.

Figure 3:
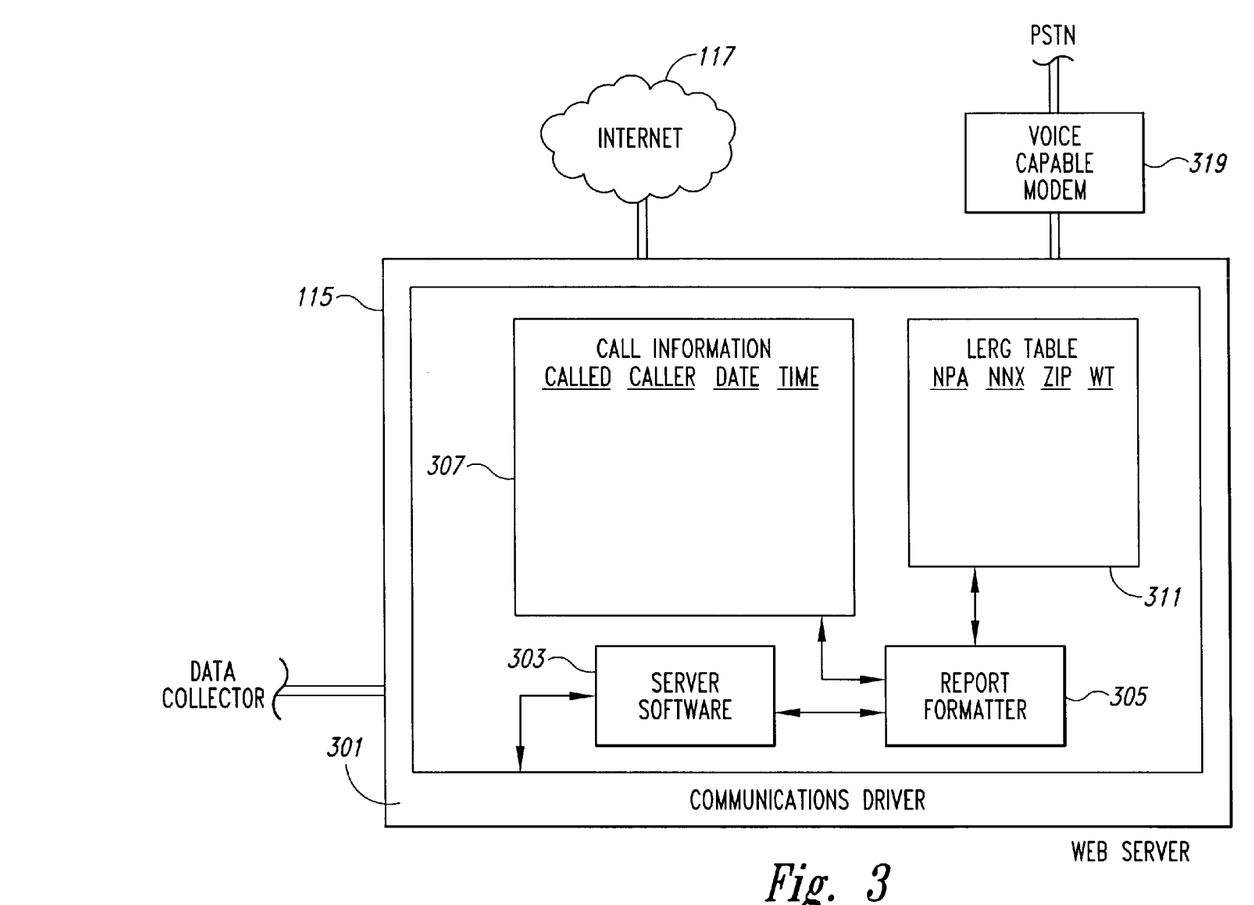
FIG. 3 is a functional block diagram of a web server element of the telecommunications environment illustrated in FIG. 1.

FIG. 3 is a functional block diagram of the web server 115 illustrated in FIG. 1. The web server 115 is a conventional data processing computer that includes software and hardware for interfacing with the data collector 113, the LEC receiving server 112, and the Internet 117 or other wide area network. That software includes a communications driver 301 for controlling the flow of information with the data collector 113, the LEC receiving server 112, and the Internet 117. In addition, the web server 115 includes a server software 303, which is software for making information stored on the web server 115 available to users of the Internet 117.

The web server 115 receives the campaign information from the data collector 113 or the LEC receiving server 112 and stores it in a campaign database 307. The campaign database 307 includes the calling information for each call placed or attempted to each campaign number. The information may be sorted within the campaign database 307 by campaign number if a subscriber maintains multiple campaign numbers. It should be noted that the web server 115 is not limited to a single campaign database 307. There may be multiple campaign databases 307, one for each subscriber or campaign number. Alternatively, one campaign database 307 may include the campaign information for all subscribers, with each campaign number being associated with the appropriate subscriber.

The server software 303 is configured to interface with the subscriber over the Internet 117 via the communications driver 301. For example, web page information (not shown) may reside on the web server 115, including HTML files readable by a web browser at the subscriber's location 111. The server software 303 is configured to respond to access by the web browser at the subscriber location 111 by presenting the HTML files as web pages having input screens and the like. The subscriber 111 provides, via the input screens, information requesting a report on the effectiveness of an advertising campaign. The server software 303 may respond to the subscriber's request by executing small programs, or "scripts," that retrieve the relevant campaign information from the campaign database 307. The scripts execute at the web server 115 and perform tasks such as invoking the report formatter 305 and passing parameters to the report formatter 305 identifying the particular input provided by the subscriber.

Other software (not shown) resident on the web server 115 may be configured to query the campaign information as it is received by the web server 115 to watch for triggering events, such as a call that results in a busy signal or no answer. If a triggering event is noticed, the software may respond by generating an alert to be transmitted to the subscriber 111. For instance, the web server 115 may include a voice-capable modem 319 or other telecommunications equipment connected to the PSTN 103. In response to a notice that a call to a campaign number resulted in a busy signal, the web server 115 may generate and transmit, via the modem 319, a paging message, including the calling party's directory number, to a predetermined directory number associated with the subscriber. Electronically issuing paging messages is known generally in the art. In this manner, the subscriber 111 may be immediately notified that a potential customer was unable to get through to the subscriber 111, and the call can be returned. The alert may be transmitted to the subscriber 111 in many other forms as well, such as by e-mail message via the Internet 117, or the like.

The report formatter 305 is a software program configured to retrieve the campaign information from the campaign database 307 and arrange it in accordance with the particular report selected by the subscriber 111. The report formatter 305 may be a database engine configured to query the campaign database 307 for the campaign information associated with the campaign number selected by the subscriber 111. The report formatter 305 is also configured to arrange the campaign information according to a particular report format identified by the subscriber. For example, the subscriber 111 may request a report on the number of calls attempted to a campaign number but which resulted in either a busy signal or no answer. Within the campaign database 307, the campaign information indicates whether a particular call resulted in a busy signal or no answer. Accordingly, the report formatter 305 retrieves from the campaign database 307 each record associated with the selected campaign number and that resulted in either a busy signal or no answer. Those records are then assembled into a tabular report and presented to the server software 303 for publication to the subscriber 111 via the Internet 117.

Also resident on the web server 115 may be additional databases, such as a Local Exchange Routing Guide (LERG) database 311. The LERG database 311 associates telephone numbers with particular information about the telephone number. For example, the LERG database 311 may describe whether the calling party's directory number originated at a cellular phone or at a land-line based phone. The LERG database 311 additionally identifies a particular LEC for the calling party. Another database may provide the approximate longitude and latitude for the area code/exchange represented by the first 6 digits of the calling party's directory number. By cross referencing that geographic information with a "zip-code database" (not shown) having zip codes associated with geographic information, the likely zip code of the Caller 101 can be identified. The zip-code database 311 is a weighted database because there is not a direct correlation between calling numbers and zip codes. Accordingly, the zip-code database 311 provides a statistical estimate of the zip code of each calling number based on the probability that the NPA-NXX of the calling number is within a particular zip code. It should be noted that calling information received from the LEC 107 at the LEC receiving server 112 may directly identify the zip code of the calling party.

The system described above enables the Subscriber 111 to access the web server 115 at any desired time and request a report on the effectiveness of an advertising campaign. The report provided reflects calls made to the selected campaign number as recently as within a few hours. This information allows subscribers of the service to direct their advertising resources to only those advertising campaigns that achieve results. In addition, because the system provides real-time information, the reports may be used to improve customer support. For example, the Subscriber 111 may request frequent reports on calls attempted but not completed to a campaign number, such as calls reaching a busy signal or no answer. Based on those reports, the Subscriber 111 may return calls to those potential customers that were unable to initially reach the Subscriber 111. In this manner, lost sales may be recovered without having to rely on the potential customer attempting a second call. The inherent benefits of this feature will be apparent to those familiar with advertising and lost sales due to insufficient salespeople to handle peak call traffic.

Processes Employed by One Embodiment

Figure 4:
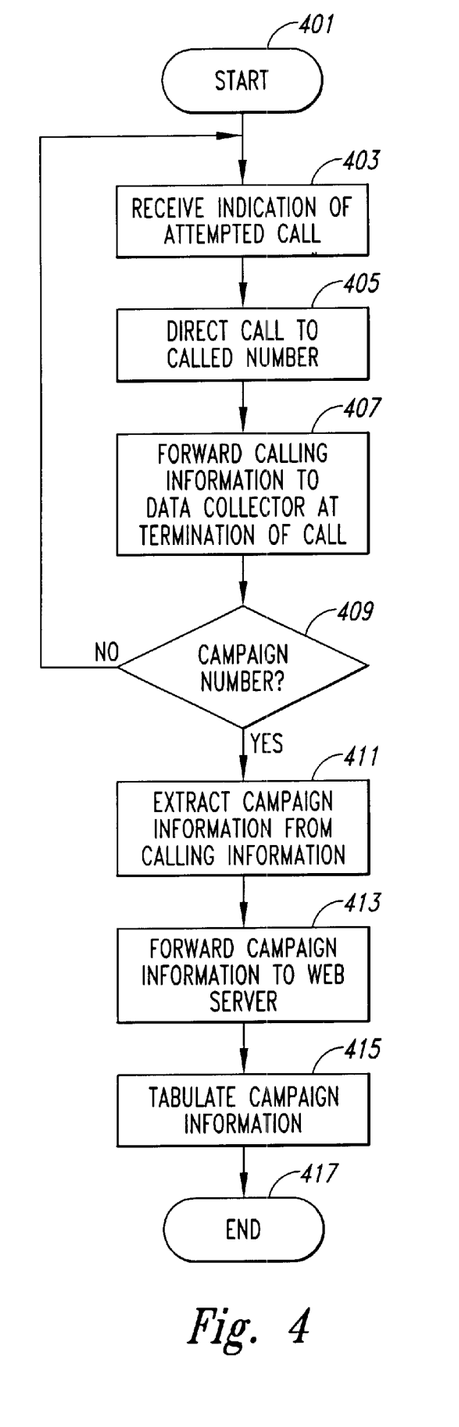
FIG. 4 is a flow chart illustrating a process for tabulating information related to the effectiveness of an advertising campaign in accordance with one embodiment of the present invention.
Figure 5A:
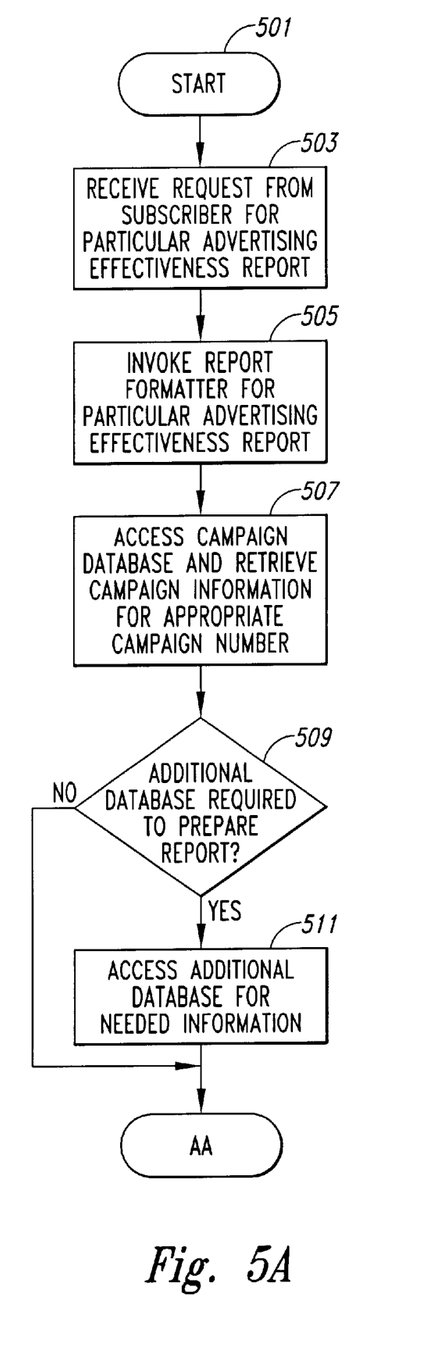
FIGS. 5A–5B are flow charts illustrating a process for generating, in response to a subscriber's request, a report on the effectiveness of an advertising campaign in accordance with one embodiment of the present invention.
Figure 5B:
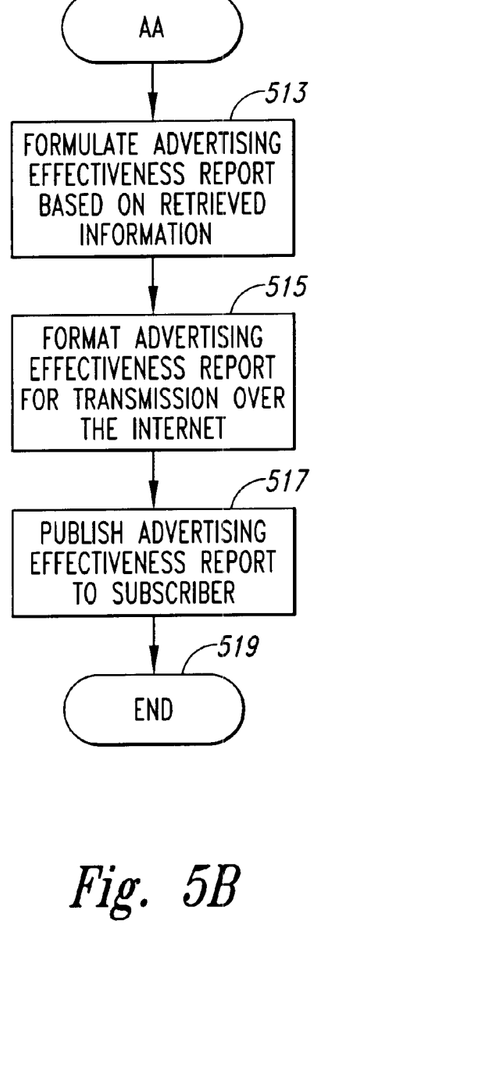

FIGS. 4, 5A, and 5B are flow charts that, taken in conjunction with the system illustrated in FIGS. 1–3, describe processes employed by one embodiment of the invention to provide reports on the effectiveness of an advertising campaign in real-time. The processes begin in FIG. 4 at starting block 401 where a caller desires to place a call to a campaign number identified in an advertisement placed by a subscriber of the reporting service. From starting block 401, processing proceeds to block 403.

At block 403, the switch 109 receives an indication that a call is being attempted. The indication comes from the PSTN 103 in the conventional manner, such as by a data message transmitted by the AIN portion of the PSTN 103. The data message includes information about the attempted call, including the directory numbers of both the calling party and the called party. Processing then proceeds to block 405.

At block 405, the switch 109 connects the call to the location identified by the called party's directory number. Once the call is connected, the calling party and the called party may communicate. Processing resumes at block 407.

At block 407, the switch 109 forwards calling information related to the call to the data collector 113 at the termination of the call. The calling information includes at least the calling party's directory number, the called party's directory number, whether the call was connected, whether the call reached a busy signal or no answer, and the length of the call if connected. The data collector 113 stores the calling information in a database, and processing resumes at decision block 409.

At decision block 409, the data collector 113 determines whether the call is associated with a campaign number. The data collector 113 may compare the called party's directory number from the calling information to a database of campaign numbers to make that determination. If the call is not to a campaign number, processing returns to starting block 401 where the system idles and awaits another call. If the call is to a campaign number, processing proceeds to block 411.

At block 411, the data collector 113 extracts the calling information associated with the call to the campaign number from the calling information database. As mentioned above, the data collector 113 may alternatively identify the calling information as related to a campaign number contemporaneously with storing it in the calling information database. In that case, extracting the calling information from the database would be unnecessary. Once the data collector 113 has identified the calling information associated with a campaign number (the campaign information), processing proceeds to block 413.

At block 413, the data collector 113 forwards the campaign information associated with the campaign number to the web server 115. The data collector 113 may forward the campaign information as it is received from the switch 109. Alternatively, the data collector 113 may identify the campaign information in the calling information database when received, but forward the campaign information at specified time intervals, such as hourly or every few hours. Processing continues at block 415.

At block 415, the web server 115 tabulates the campaign information received from the data collector 113. The web server 115 maintains a database of the campaign information associated with each campaign number (the campaign database 307). The campaign database 307 reflects all the campaign information currently available at the web server 115. In this manner, the web server 115 is configured to provide reports based on the campaign information as well as certain other databases that may supplement the campaign database 307.

FIGS. 5A–5B are flow charts illustrating a process for causing the web server 115 to generate a report based on the campaign information. The process begins at starting block 501, where a subscriber 111 desires to generate a particular report on the effectiveness of an advertising campaign undertaken by the Subscriber 111. The Subscriber 111 has a connection to the Internet 117 over which access to the web server 115 can be made. Processing continues at block 503.

At block 503, the web server 115 receives a request from the Subscriber 111 for the particular report. The request may indicate that a report on the total number of calls made to a particular campaign number is requested. Or the request may indicate that the Subscriber desires a report of all the calls made to the campaign number that resulted in no answer or a busy signal. Moreover, the request identifies a particular campaign number or numbers to include in the report. After the web server 115 receives the request from the Subscriber 111, processing proceeds to block 505.

At block 505, the web server 115 invokes the report formatter 305. The report formatter 305 is configured to formulate many different types of reports, including the report requested by the Subscriber 111. The report formatter 305 receives from the web server 115 a parameter defining the particular report requested by the Subscriber 111, including the specified campaign number. Processing proceeds to block 507.

At block 507, the report formatter 305 accesses the campaign database 307 and retrieves the relevant campaign information for the campaign number specified in the Subscriber's request. The relevant campaign information may be all of the campaign information associated with the selected campaign number, or it may be only a portion of the available campaign information. Processing proceeds to decision block 509.

At decision block 509, the report formatter 305 determines whether additional databases are required to prepare the selected report. For instance, if the Subscriber 111 requested a report of the zip codes from which calls were placed during the advertising campaign, an additional database would be necessary to prepare the report. Other situations where additional databases might be required will be apparent to those skilled in the art. If no additional databases are necessary, processing proceeds to block 513. If additional databases are required to prepare the report, processing proceeds to block 511.

At block 511, the report formatter 305 accesses the needed additional database to retrieve the information necessary to prepare the selected report. For example, if the Subscriber 111 requested a zip-code based report, the report formatter 305 may access a zip code database (not shown) to retrieve information to prepare that report. Those skilled in the art will appreciate that many additional databases may be used to supplement the databases described here, and the invention is not limited to the examples provided. Examples of other such databases include property tax databases, motor vehicle records databases, census information databases, voter registration databases, and the like. After the report formatter 305 has retrieved the necessary information from any additional databases, processing proceeds to block 513.

At block 513, the report formatter 305 formulates the selected report based on the campaign information retrieved at block 507 and any additional information retrieved at block 511. Formulating the report may involve simply tabulating the retrieved information, or additionally, formulating the report may involve cross referencing the campaign information with information retrieved from additional databases. Moreover, formulating the report may involve analyzing the campaign information to generate statistics on the callers reflected in the campaign information. For example, the report formatter 305 may analyze the NXX prefixes of each directory number reflected in the campaign information and compare that data to information retrieved from another database, such as the LERG database 311, that identifies whether the directory number relates to a conventional telephone service subscriber or to a cellular telephone service subscriber. Formulating reports of this kind provides important demographic information to the Subscriber 111. Examples of particular types of reports are provided below. After the report formatter 305 has formulated the report, processing proceeds to block 515.

At block 515, the report formatter 305 provides the report to server software 303 resident on the web server 115. The server software 303 then formats the report for transmission over the Internet 117. The server software 303 may create a HyperText Markup Language ("HTML") file which is capable of being read by a conventional web browser. Those skilled in the art will appreciate that the functions performed in blocks 513 and 515 are not necessarily performed serially. In other words, the report formatter 305 and the server software 303 may act in unison to concurrently perform both the functions of formulating the report and formatting the report for transmission over the Internet 117. For clarity only, those two functions have been separately described. With the report properly formatted for transmission over the Internet 117, processing proceeds to block 517.

At block 517, the web server 115 publishes the advertising effectiveness report to the Subscriber 111 over the Internet 117 in the conventional manner. Processing then terminates at ending block 519.

Figure 6:
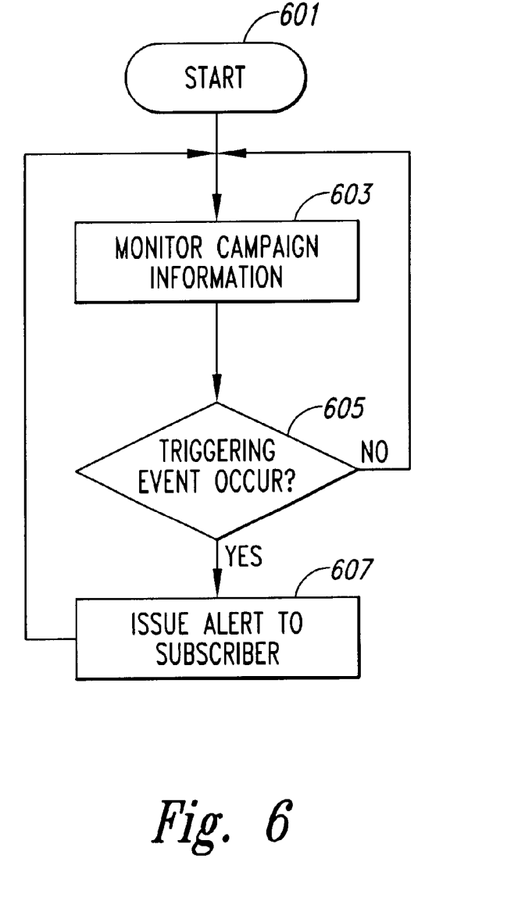
FIG. 6 is a flow chart illustrating a process employed by one embodiment of the present invention for alerting a subscriber that a triggering event has occurred.

FIG. 6 is a flow chart illustrating a process employed by one embodiment of the present invention for alerting the subscriber 111 that a triggering event has occurred. The process of FIG. 6 is preferably performed by software resident on the web server 115. However, many alternatives are envisioned for a mechanism to perform the process of FIG. 6, such as by hardware resident on the web server 115, by software or hardware resident on the data collector 113, or by a separate computer or data processing equipment connected to the switch 109, the data collector 113, or the web server 115 and being dedicated to the function of monitoring the calling information for triggering events. The process begins at starting step 601 where the system described above is operational and calling information is being gathered by the data collector 113 and forwarded to the web server 115. The process continues at block 603.

At block 603, the campaign information is monitored for triggering events. This example describes the situation where the triggering event is a call to a campaign number that resulted in either a busy signal or no answer. Other triggering events may include the amount of calling activity to the campaign or a particular campaign number exceeding a given threshold, a certain number of calls (i.e., every hundredth call or the like) being attempted or completed, or a call from a predetermined calling number. Many other triggering events will become apparent to those skilled in the art based on a study of this disclosure. At decision block 605, processing returns to block 603 until a triggering event is encountered. When a triggering event is encountered, processing proceeds to block 607.

At block 607, an alert is issued in response to the triggering event. As discussed above, the alert may take the form of an electronic paging message to the subscriber 111 or an entity responsible for the advertising campaign. If the triggering event was a busy signal or an unanswered call, the paging message should include the calling party's directory number. In that manner, the subscriber 111 is provided the opportunity to immediately return the call to the potential customer. Of course, alternative mechanisms may be employed for issuing the message to the subscriber 111, such as by e-mail, voice mail, human interaction, or the like. After the alert is issued to the subscriber 111, processing returns to block 603 where the campaign information is again monitored.

Exemplary Advertising Effectiveness Reports

Those skilled in the art will appreciate that many types of reports may be generated by the above described embodiments of the invention. By way of example only, particular reports that can be generated by the embodiments described above include:

Percentage of Calls Per Campaign: This report provides the Subscriber with comparative information between campaigns. The report identifies the percentage of the total calls to the Subscriber associated with each campaign. This report allows the Subscriber to identify those advertising mechanisms that are most effective.

Total Calls Per Campaign: This report provides the Subscriber with a total number of calls to each campaign number. This report may include the calling information for each of the calls to a campaign number. The Subscriber can use this information to determine the per-dollar effectiveness of the campaign by comparing the total number of calls to the amount of money spent on the campaign.

Average Calls Per Day: This report provides the Subscriber with per-day totals of calls made to either a particular campaign number or to all the campaign numbers. The Subscriber can use this report to easily identify those days with the heaviest call traffic for support planning purposes.

Average Call Duration: This report provides the Subscriber with a length of time that the average call to a campaign number lasts. This information is useful to the Subscriber when planning the number of support personnel to dedicate to a campaign.

RNA/Busy: This report provides the Subscriber with a listing of the calls that either were not answered (RNA) or received a busy signal. This information allows the Subscriber to attempt and recover lost sales. The Subscriber may provide this report to particular support personnel with the task of returning those calls and attempting to satisfy whatever needs the callers may originally have had.

Demographic Reports: The system described above is capable of providing demographic reports as well. For example, the calls made to a campaign number may be tabulated by area code directly to provide the Subscriber with a broad overview of geographic locations responding to a campaign. Additional databases may be used to more specifically identify geographic regions responding to a campaign. Additional databases, such as those available from Census information, may be employed to generate financial, ethnic, and age-related demographic information which may be of use to the Subscriber.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for monitoring and reporting on the effectiveness of an advertising campaign identified by a reverse-billing campaign number, comprising:

a interexchange switch configured to extract calling information associated with a call directed to said reverse-billing campaign number associated with the interexchange switch, the interexchange switch further configured to forward the calling information to a data recorder;

the data recorder being configured to store the calling information and to parse campaign information from the calling information, the campaign information comprising calling information associated with a call to the reverse-billing campaign number, the data recorder being further configured to forward the campaign information to a web server;

the web server being configured to accumulate the campaign information and to forward the campaign information over a wide area network in response to a request for the campaign information associated with the reverse-billing campaign number.

2. The system of claim 1, wherein the calling information includes a calling party directory number associated with the party initiating the call.

3. The system of claim 1, wherein the calling information includes an indication that the call received a busy signal when an attempt was made to connect the call to the reverse-billing campaign number.

4. The system of claim 1, wherein the calling information includes an indication that the call was not answered.

5. The system of claim 1, wherein the calling information includes a date and time of day that the call was initiated.

6. The system of claim 1, wherein the calling information includes a duration indicating the length of time the call was connected.

7. The system of claim 1, wherein the data recorder is further configured to forward the campaign information to the web server upon the completion of the call.

8. The system of claim 1, wherein the data recorder is further configured to forward the campaign information to the web server at a specified time interval.

9. The system of claim 8, wherein the specified time interval is less than monthly.

10. The system of claim 9, wherein the specified time interval is less than daily.

11. The system of claim 1, wherein the web server is further configured to formulate a report based on the campaign information in response to the request for the campaign information.

12. The system of claim 11, wherein the report comprises a listing of attempted calls to the reverse-billing campaign number that resulted in a busy signal.

13. The system of claim 11, wherein the report comprises a listing of attempted calls to the reverse-billing campaign number that were not answered by the called party.

14. The system of claim 1, wherein the wide area network is the Internet.

15. The system of claim 1, wherein the web server is further configured to formulate a report based on the campaign information at predetermined time intervals.

16. The system of claim 1, wherein the web server is further configured to formulate a report based on the campaign information in response to a triggering event.

17. A method of reporting the effectiveness of an advertising campaign using a telecommunications system for connecting a call from a calling party to a called party, comprising:

accumulating calling information associated with a reverse-billing campaign number;

in response to a request for a report, formulating the report based on the accumulated calling information for the reverse-billing campaign number;

formatting the report for transmission over the Internet; and transmitting the formatted report over the Internet to an entity associated with the advertising campaign.

18. The method of claim 17, wherein the accumulating occurs substantially continuously and the report includes the last calling information accumulated.

19. The method of claim 17, wherein the calling information is accumulated in a campaign database stored on a web server accessible over the Internet.

20. The method of claim 19, wherein formulating the report comprises accessing the campaign database to retrieve the calling information associated with the reverse-billing campaign number and tabulating the calling information in accordance with the request for the report.

21. The method of claim 17, wherein formatting the report comprises converting the report to a HyperText Markup Language readable by a web browser.

22. The method of claim 17, wherein the report comprises a listing of calls attempted to the reverse-billing campaign number which reached a busy signal.

23. The method of claim 17, wherein the report comprises a listing of calls attempted to the reverse-billing campaign number which were not answered.

24. The method of claim 17, wherein the report comprises a geographical indication of the location from which the call was initiated.

25. The method of claim 24, wherein the geographical indication is a zip code.

26. The method of claim 17, wherein the formatted report is transmitted over the Internet as electronic mail.

27. A method of reporting the effectiveness of an advertising campaign carried out by a subscriber using a telecommunication system for connecting a call from a calling party to a called party, comprising:

monitoring calling information associated with a reverse-billing campaign number;

in response to the occurrence of a triggering event, generating an alert associated with the calling information; and transmitting the alert to an entity associated with the subscriber carrying out the advertising campaign.

28. The method of claim 27, wherein the triggering event includes an attempted call to the campaign number that resulted in no answer.

29. The method of claim 27, wherein the triggering event includes an attempted call to the campaign number that resulted in a busy signal.

30. The method of claim 27, wherein transmitting the alert comprises issuing a paging message to the entity associated with the advertising campaign.

* * * * *